Jan. 3, 1961   J. W. FARRELL   2,966,879
LEVEL INDICATOR FOR A TANK
Filed Oct. 17, 1958
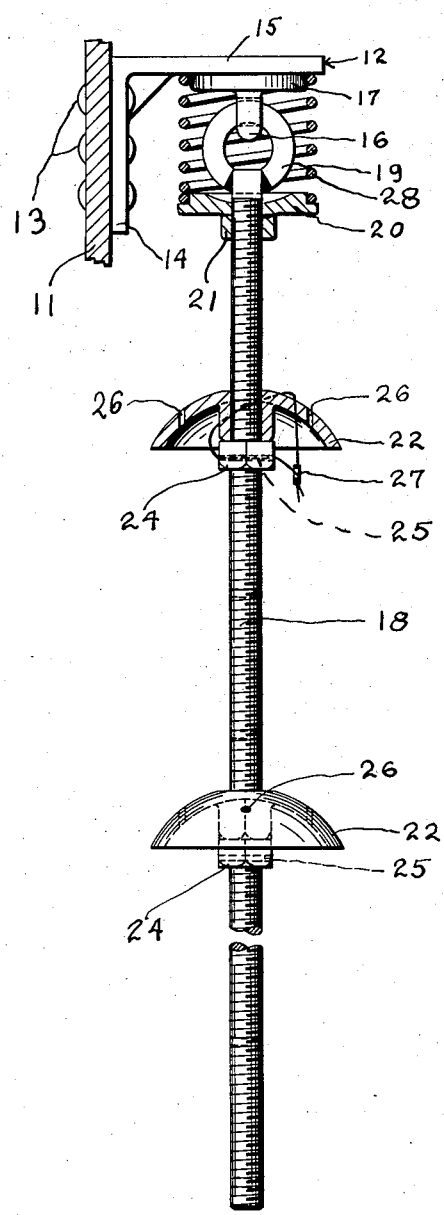
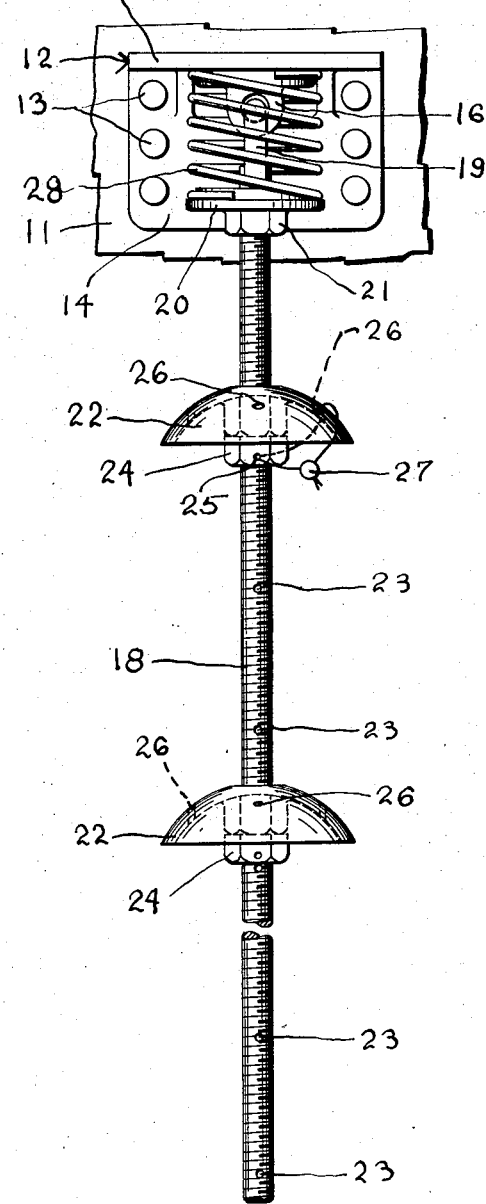
INVENTOR.
JOHN W. FARRELL
BY Norman N. Popper
ATTORNEY

United States Patent Office 2,966,879
Patented Jan. 3, 1961

2,966,879

LEVEL INDICATOR FOR A TANK

John W. Farrell, 297 Ivy St., Kearny, N.J.

Filed Oct. 17, 1958, Ser. No. 767,799

1 Claim. (Cl. 116—118)

My invention relates generally to a level indicator for a tank and more particularly to a device of this character which functions as a gauge to indicate the volume of liquid in the tank.

It is an object of my invention to provide a marker with a threaded rod which is attached to the top of the tank close to the filler port and which rod has thereon a threaded marker positionable at various levels to indicate the volume of liquid in the tank.

It is a further object of my invention to provide a device of the class described which is deflectable when contacted by the nozzle of a filler hose and will return to its original normal position.

A still further object of my invention is to provide a firm mounting for a level indicator for tanks with a deflectable threaded rod attached thereto and a spring, normally maintaining the threaded rod in a vertical position.

Yet a further object of my invention is to provide a level indicator for a tank which is durable and relatively resistant to breakage or deformation.

Yet a further object of my invention is to provide a level indicator for a tank which may be sealed at a plurality of chosen levels.

These objects and advantages, as well as other objects and advantages may be achieved by the device illustrated in the drawings, in which Figure 1 is a side-elevation view of an indicator, partially in section;

Figure 2 is a front-elevational view of the indicator.

Level indicators for tanks have been known and used before the present invention. However, they were rigidly secured adjacent to the filler port of a tank and were frequently bent and deformed or damaged when the nozzle of a filler hose or other filling device was inserted into the filler port and came in contact with a portion of the level indicator. The deformation of the level indicator resulted in it giving inaccurate readings of the volumetric contents of the tank; frequently the level indicator was broken off and had to be retrieved from the tank. The present invention is a deflectable level indicator having a spring-pressed threaded rod normally urged to a vertical position. Forceable contact with this rod will cause it to yield to the contacting element, rather than break or deform. When the contacting element such as the filler nozzle of a hose is removed from the immediate vicinity of the threaded rod, the spring returns the rod to normal vertical position where it is undamaged and will give an accurate reading with respect to the liquid level.

Referring now to the drawings in detail, a tank is usually provided with a filler port surrounded by an upstanding flange 11. A bracket 12 may be attached to the flange 11 by rivets 13 or other suitable means. The bracket 12 may be in the form of an inverted L, having a vertical leg 14 and a horizontal leg 15, an eye member 16 formed on the underside of a disk 17 is secured to the horizontal leg 15 of the bracket 12, The disk 17 may be welded to the leg 15.

A threaded shaft 18 is provided with an eye member 19 at its upper end. The eye 19 is interlocked and universally pivoted with the eye 16 so that the threaded shaft 18 may pivot in all directions.

A collar 20 is carried by the top of the threaded shaft 18 and maintained in engagement with an eye 19 by a nut 21. A concavo-convexo body 22 is mounted in threaded engagement on the shaft 18. Several such markers 22, 22 may be applied to the shaft at various elevations to mark predetermined quantities of liquid introduced into the tank. The shaft 18 is provided with transverse passages 23, 23, etc. A nut 24 having a transverse passage 25 may be also disposed on the shaft 18 in threaded engagement therewith and serve to lock the marker 22 at a chosen level by frictional engagement therewith. The marker 22 may be provided with passages 26 and a seal 27 may be applied to a wire introduced through the passages 23, 25, 26, to prevent unauthorized adjustment and readjustment of the level of the marker 22 once it has been set. The normal position assumed by the shaft 18 will be vertical due to the effect of gravity. The shaft 18 is, however, maintained in this normal position regardless of the position of the tank by a spring 28 which normally urges the shaft 18 to the vertical position. This spring is seated upon the disc 17 and is also seated upon the collar 20.

It will be seen that a rigid object coming into contact with the marker 22 or the shaft 18 will cause it to be deflected, since it is yieldably mounted and the spring 28 will restore the shaft 18 to its normal position once the deflecting object's contact is removed. In this manner breakage and deformation is avoided and the accuracy of the marker is at all times maintained unimpaired.

The foregoing description is merely intended to illustrate an embodment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claim, although they are not specifically catalogued herein.

I claim:

A support for a liquid level indicator for a tank comprising an inverted L-shaped bracket having vertical and horizontal legs, said vertical leg being adopted to be secured to the tank, said horizontal leg having a bottom portion and defining a disk, a first eye member secured to the bottom portion of the horizontal leg at the center of the disk, a second eye member universally pivoted to said first eye member, a rod attached to said second eye member, a collar attached to said rod adjacent to and below said second eye member and defining at the top thereof a spring engaging seat and a spring engaged with the disk on said horizontal leg and the spring engaging seat on said collar, whereby the rod is normally maintained in a perpendicular position with respect to the horizontal leg of the bracket and a vertically adjustable marker carried by the rod.

References Cited in the file of this patent

UNITED STATES PATENTS

| | | |
|---|---|---|
| 662,219 | Carter | Nov. 20, 1900 |
| 930,139 | Borer | Aug. 3, 1909 |
| 1,445,098 | Mays | Feb. 13, 1923 |
| 1,695,829 | Taudvin | Dec. 18, 1928 |
| 2,077,547 | Busse | Apr. 20, 1937 |
| 2,623,492 | Rath | Dec. 30, 1952 |